United States Patent [19]

Shomo

[11] Patent Number: 4,964,768
[45] Date of Patent: Oct. 23, 1990

[54] CARGO STABILIZING DEVICE

[76] Inventor: Douglas A. Shomo, 32841 Park La., Garden City, Mich. 48135

[21] Appl. No.: 351,934

[22] Filed: May 15, 1989

[51] Int. Cl.⁵ ............................................. B61D 45/00
[52] U.S. Cl. ....................................... 410/94; 410/96; 410/121; 410/145; 410/151
[58] Field of Search ..................... 410/94, 96, 95, 121, 410/122, 123, 104, 105, 129, 143, 139, 135, 136, 127, 144–153, 156

[56] References Cited

U.S. PATENT DOCUMENTS

| | | | |
|---|---|---|---|
| 1,949,218 | 2/1934 | Owens | 105/366 |
| 2,764,105 | 9/1956 | Stiegel | 105/369 |
| 4,027,892 | 6/1977 | Parks | 280/179 |
| 4,200,046 | 4/1980 | Koliba et al. | 410/94 |
| 4,217,831 | 8/1980 | Koliba et al. | 410/121 |
| 4,343,578 | 8/1982 | Barner | 410/151 |
| 4,396,324 | 8/1983 | Ellis | 410/104 X |
| 4,396,325 | 8/1983 | Joice-Cavanagh | 410/129 |
| 4,473,331 | 9/1984 | Wisecarver | 410/151 X |
| 4,676,705 | 6/1987 | Kuster et al. | 410/105 X |
| 4,717,298 | 1/1988 | Bott | 410/129 |
| 4,720,222 | 1/1988 | Nagy et al. | 410/151 |
| 4,772,165 | 9/1988 | Bartkus | 410/139 |

Primary Examiner—Douglas C. Butler
Attorney, Agent, or Firm—Charles W. Chandler

[57] ABSTRACT

A cargo stabilizing device has a channel member with studs extending from one wall to engage keyhole-shaped holes spaced a certain distance apart in a support. A movable member can slide in the channel member and has teeth that can be engaged by a panel on the channel member to lock the movable member in any of the more closely spaced positions defined by the spacing between the teeth. The movable member has a further adjustable member with a surface that engages the cargo to hold it in place. The adjustable member can be moved to any position within a range at least as long as the distance between the teeth on the movable means. Selection of the holes into which to engage the studs, and selection of a specific tooth, and setting the adjustable member allows the surface of the latter to be placed at any point in the entire range of positions possible within the locations available in the entire set of holes in the support.

12 Claims, 3 Drawing Sheets

CARGO STABILIZING DEVICE

BACKGROUND OF THE INVENTION

This invention relates to means for restraining movement of cargo while it is being transported on a movable platform. In particular, the invention relates to a restraining device with a pressure surface at one end, the device comprising means to lock it in any one of a plurality of locations uniformly spaced apart in one direction, the device including means to move the pressure surface in smaller steps from one of the locations to the next and further means to move the pressure surface incrementally between successive ones of the steps.

The need for providing some means for preventing undesired movement of cargo while it is stored or is being transported by a moving vehicle has long been recognized. One way to limit such movement is to provide a series of surfaces, such as the faces of the teeth of a rack or rachet or the side walls of a series of holes evenly spaced apart in one direction, the surfaces being substantially perpendicular to that direction. A blocking device provided with projecting means can be positioned to allow the projecting means to make contact with one or more of the surfaces to hold the blocking device in a fixed location chosen to prevent movement of the cargo in at least the one direction. In U.S. Pat. Nos. 1,949,218 to Owens and 2,764,105 to Stiegel, the surfaces are gear or ratchet teeth engaged by a pawl or the like. The surfaces can also be sides of holes on an elongated member as shown in U.S. Pat. Nos. 4,200,046 to Koliba and Napel and 4,217,831 to Koliba, Oakes, Jr., and Napel. In both of the latter patents, the surfaces defining the side walls of the holes in the elongated member are engaged by studs that extend from a blocking device and, once in one of the holes, have to be twisted to be locked in place.

In all of the foregoing patents the surface of the blocking device that engages the cargo can only be positioned at certain fixed points spaced apart from each other by the distance between successive ones of the surfaces engaged by the projection means, that is, by the distance between successive gear or rachet teeth in the devices of Owens and Stiegel and successive holes in the cases of the two Koliba, et al. devices.

It is frequently desirable to hold the cargo in a certain position that would be between the fixed positions of the aforesaid patents. In FIG. 8 of U.S. Pat. No. 4,027,812, Parks shows a cargo restraining assembly that provides adjustable blocking means. However, the blocking means are opposing wedges that engage studs mounted in the holes at specific locations in the false floor of a cargo vehicle. The wedges are entirely separate from the studs, not lockingly engaged with them, and not necessarily available when needed.

Bott in U.S. Pat. No. 4,717,298 and Joice-Cavanagh in U.S. Pat. No. 4,396,325 show means for blocking the position of cargo at any location along a longitudinal direction, but the blocking is effected by frictional means, which could be forced loose by the continuing vibrational movement of the cargo vehicle.

SUMMARY OF THE INVENTION

It is one of the objects of this invention to provide a cargo restraining device that can be set to any of a number of positions each spaced from the next by a first distance in one direction. The device includes means movable in steps smaller than the first distance, and additional means movable to any position between successive ones of the steps, whereby the cargo can be blocked at any incremental location within the overall range of locations.

Another object is to provide cargo restraining means that can be moved from one location to another in a first direction and supports a bar extending laterally with respect to the first direction as a transverse barrier across a cargo space.

Further objects will become apparent to those skilled in the art after reading the following description with reference to the drawings.

One form of restraining device in accordance with this invention comprises a channel member with means to engage a support member at any of a plurality of locations spaced apart by a first distance in a first direction. Another member is slidably movable in and guided by the channel means to move longitudinally along it. The movable member has a plurality of teeth spaced apart along at least part of its length, and the channel means includes an opening and a pawl mounted to enter the opening to engage any of the teeth that happen to be accessible through the opening at the time of such entry. The movable member includes, at its first end, an adjustable member, the forward surface of which defines the blocking position of cargo. The adjustable member is capable of being adjusted incrementally by any fraction of the distance between corresponding locations on two adjacent teeth of the movable member, and the number of such teeth is such that they extend at least substantially the distance between one of the locations in which the restraining device may be set and the next adjacent such location. This allows the forward surface of the adjustable member to be held firmly at any position within the entire range of locations in which the restraining device can be held.

In using the restraining device, the channel means is set in the location where the end surface of the adjustable member will be close to the cargo surface to be blocked. Then the movable member is moved forward to bring the adjustable member as close as possible to the cargo surface, and the pawl is moved into engagement with one of the teeth on the movable member to hold it firmly in that position. Then the adjustable member can be adjusted so that its cargo-engaging surface presses against the cargo, either directly or by way of an intermediate structure, such as a brace or a bulkhead. If it is important to apply considerable pressure to the cargo by way of the adjustable member, the pawl can be released and the movable member retracted enough to allow the adjustable member to be moved slightly farther forward. When the pawl is again forced against the same tooth on the movable member, the cargo-engaging surface of the adjustable member is pressed against the cargo (or bulkhead) with any desired amount of pressure.

While the locations in which the restraining device can be set, can be defined by holes in a wall surface, including a floor surface, of the cargo vehicle, the retaining structure can also include a separate elongated support member attached to the cargo vehicle and provided with holes spaced apart according to the desired distance between the locations. The channel member can be attached rigidly to means that will hold it in a fixed position with respect to the cargo vehicle, and the restraining device can be positioned along the channel member as described above.

The cargo can be pressed against a fixed part of the cargo vehicle structure, or a fixed restraining device can be provided with engagement means to engage the support member at any of the locations.

In order to provide a barrier across an open cargo area to hold cargo within a certain part of that area, the restraining devices can be provided with recesses in what would normally be their cargo-engaging surfaces. Bars, which may be telescopic, can then be attached to restraining devices that are spaced apart, for example on opposite sides of the cargo area. The remote ends of the bars include pins to be received in the recesses in the restraining devices so that both ends of the bars will be held in fixed position to provide the necessary cargo barrier.

DESCRIPTION OF THE DRAWINGS

This description refers to the accompanying drawings in which like reference characters refer to like parts throughout the several views and in which.

DESCRIPTION OF THE PREFERRED EMBODIMENT

Figure 1:
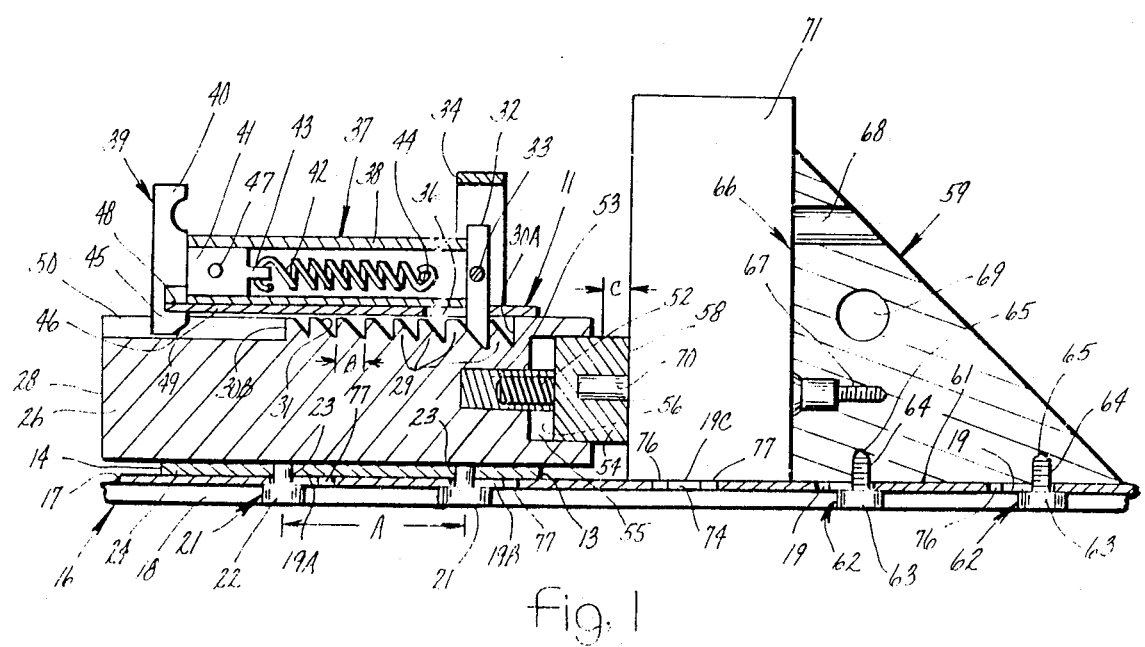
FIG. 1 is a cross-sectional view of a restraining structure according to the invention.

FIG. 1 shows a restraining device 11 that includes channel means 12. In this embodiment, the channel means consists of a short length of square tubing typically about 2" on each side, that has first and second ends 13 and 14. The channel means 12 engages a support member 16, which is shown as having a raised platform 17 with a depending wall 18 the lower edge of which rests on, or is attached to, a surface on which the restraining device is to be mounted. The raised part 17 of the support member has a plurality of holes 19 evenly spaced along it, and the restraining device includes two studs 21 to serve as engagement means that connect the restraining device to the support member. Each of the studs has an enlarged head 22 and a neck 23 of a somewhat smaller diameter. The necks of the studs are welded into holes in the bottom wall 24 of the channel means 12, and the distance between the lower surface of the wall 24 and the juxtaposed surface of the heads 12 is substantially equal to the thickness of the raised central part 17 of support means so as to cause that part of the support means between the lower surface of the wall 24 and the juxtaposed surface of the heads 12 to grip the raised central part 17 securely when the restraining device is put in place on the support member. The height of the wall is at least as great as the vertical thickness of the heads 22.

The distance between any pair of adjacent holes 19, and therefore the distance between the studs 21 that constitute the engagement means between the restraining device 11 and the support member 16 is equal from hole to hole which allows the restraining device to be moved along the support member from a location in which the studs 21 engage the support member at one pair of holes 19A and 19B to the position in which they engage the holes 19B and 19C and so on. In moving from one location to the next, it is convenient to say that the restraining device 11 has moved a first distance A, which is the distance between any two adjacent holes 19.

A movable member 26, the cross section of which substantially matches the inner cross section of the channel means 12, is guided by the channel means so that it can slide forward and backward therein. The movable member has a front end 27 and a back end 28, and a series of evenly spaced, substantially identical teeth 29 is formed in the upper surface of the movable member 26. In this embodiment, the teeth 29 are of saw-tooth shaped cross-section with substantially vertical rear sides 30 and sloping front sides 31. Preferably the distance between the forward most vertical side 30A and the rearmost vertical side 30B is at least equal to the first distance A between corresponding parts of adjacent pairs of the holes 19. This allows the member 26 to be moved along the entire length of the support member 16 in incremental steps much smaller than the distance from one location of the restraining device 11 to the next. If the distance between corresponding locations on adjacent teeth 19 is defined as being equal to a second distance B and there are n teeth, the total stepwise distance that the movable member can be moved for any setting of the restraining device 11 is n x B and this is preferably at least equal to or greater than the first distance A.

The distance of movement of the movable member 26 relative to the channel means 12, is determined by a pawl 32, which, in this instance, is pivotally mounted on an axle 33 held in a bale, or strap, 34, that bridges over top of the channel means 12 and is rigidly attached, preferably by means of welding, to the sides of the channel means. The strap 34 can also serve as a handle by which to carry the channel means, or even the whole structure in FIG. 1 from one place to another. The pawl extends through an opening 36 in the channel means 12 so that it is able to engage any one of the teeth 29 that happens to be accessible through that opening. The specific tooth that happens to be accessible at any time depends on the relative position of the channel means and the movable member 26.

The pawl 32 has handle means 37 that includes a length of square tubing 38 normally of smaller cross-sectional size than the tubing used as the channel means 12. One end of the tubing 38 is rigidly attached to the pawl 32, preferably by being welded thereto, and the length of the tubing 38 is substantially equal to the length of that part of the channel means 12 from the end 14 to a location just below the axle 33. The handle means 37 includes latching means 39 comprising a finger grip 40 and a plunger portion 41 that substantially fits the interior of the tubing 38 but is enough smaller than the tubing to be able to slide easily therein. The plunger 31 is pulled into the end of tubing 38 by a spring 42 stretched between an eye 43 on the end of the plunger 41 and a cross-pin 44. In that position, a hole 47 in the plunger is aligned with holes in opposite walls of the tubing 38 to allow a shackle of a padlock to be passed through those aligned holes to lock the handle means 37 in place.

The latching means 39 also includes a hook 45 with a beveled surface 46 that engages a beveled surface 48 on the upper wall 49 of the channel means to cam the hook 45 out far enough to pass the outermost part of the wall 49 and then be pulled back under the wall 49 by the force of the spring 42 to lock the handle means in place in a position shown in FIG. 1. This forces the pawl 32 firmly against the vertical surface 30 of the accessible tooth 29 and locks the movable member 26 to prevent it from moving longitudinally in either direction. In particular it prevents the movable member from being forced to the left, relative to the position shown in FIG. 1, since the vertical front surface of the pawl engages the vertical rear surface of whichever tooth is accessible when the handle means 37 is locked against the channel means 12. A wide slot 50 is formed in the rear part of the movable member 26 to accommodate the hook 45 so that the tubing 38 can lie flat against the upper wall 49 of the channel means 12.

The restraining device 11 also includes further adjustment means movable to any position within the second distance B between two adjacent ones of the teeth 29. The further adjustment means includes a threaded pin 52 in a threaded hole 53 that extends longitudinally into the front end of the movable member 26. While the forward end of the pin 52 could extend beyond the front end 27 of the member 14, the embodiment in FIG. 1 includes a cylindrical head 54 of larger diameter than the pin. This cylindrical head fits at least partly into a recess 55 in the movable member 14, and, in this embodiment, the axial length of the cylindrical head is a little longer than the axial depth of recess 55 so that even when the rear surface 56 of the head 54 butts up against the end surface 57 of the recess 55, the front surface 58 of the head still extends beyond the front surface 27 of the movable member 26. The length of the threaded pin 52 and the threaded recess 53 is enough greater than the distance B between corresponding locations on adjacent ones on the teeth 29 to permit the front, or pressure, surface 58 to be moved over a third longitudinal distance C that is preferably at least as great as the distance B. This permits the surface 58 to be set in any position relative to the support member 16, first by being moved a distance A from one location to the next by engagement of the studs 21 with the holes 19, and then in steps B relative to that location by pivoting the pawl 32 out of the way and moving the member 26 to allow any of the teeth 29 to be accessible through the opening 36. Finally, the pin 52 can be screwed into the threaded recess 53 to the extent necessary to place the front surface 58 at any point between the specific locations of the movable member 26 corresponding to the engagement of the pawl 32 and any of the teeth 29.

FIG. 1 also shows another restraining device 59 of generally triangular shape having one surface 61 that rests on the upper surface of the raised part 17 of the support member 16 and is provided with engagement mean in the form of two studs 62 that can be identical with the studs 21. The studs 62 have heads 63 and necks 64 which are not only of smaller diameter than the heads, but, in this case, are threaded to fit into threaded holes 65 in the restraining device 59. The face 66 of the restraining device 59 also has a recess 67, which, in this instance, is threaded. In addition, the restraining device 57 has two channels 68 and 69 through which a rope can be passed to assist in holding cargo in place. The adjustable member 54 has a recess 70, which serves the same purpose as the recess 67 and will be described hereinafter.

For the sake of illustration, a block 71 is shown between the restraining devices 11 and 59 to illustrate how cargo would be held in place. While the block 71 illustrated in FIG. 1, is more or less of the same size as the restraining devices 11 and 59, it could be larger or smaller. It could also be in the form of a relatively thin plate forming a bulkhead perpendicular to the support member 16 or any other configuration that would allow it to be gripped between the pressure surface 58 and the surface 66.

Figure 2:
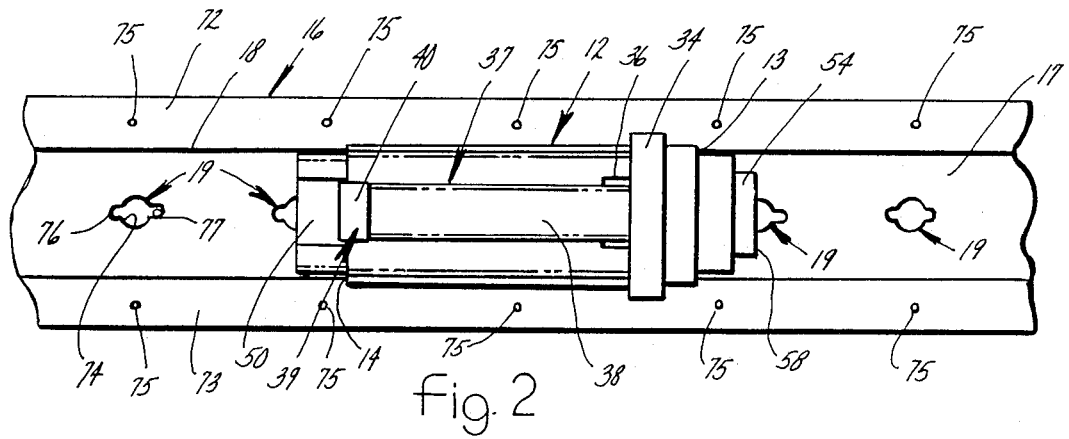
FIG. 2 is a top view of the apparatus in FIG. 1.

FIG. 2 is a view looking down on the apparatus in FIG. 1. In this embodiment the width of the channel means 12 is approximately the same as the width of the raised central part 17 of the support member 16, but the width of the retaining device 59 is only about half the width of the raised central part 17. The top view shows that there are two flanges 72 and 73 along the edges of the support member 16. The flange 72 extends from the lower edge of the vertical wall 18 shown in FIG. 1, and the flange 73 extends from a corresponding vertical wall at the opposite edge of the raised central portion 17. The flanges have bolt holes 75 through which bolts can pass to be threaded into a floor or other substitute or into bolts on the other side of the substrate.

The holes 19 are shown as having a relatively large central open area defined by a wall portion 74 and narrower slots 76 and 77 that extend from the central open area in the longitudinal direction of the support member 16. The central open area defined by the wall portion 74 is large enough to permit the head 22 or 63 of one of the studs 21 or 62 shown in FIG. 1 to pass through it, and the slots 76 and 77 are wide enough to receive the neck 23 or 64 of the stud but not large enough to allow the head to pass through. Consequently, when the two studs 22 are in the holes 19, as shown in FIG. 1 and the front surface 58 is pressed against the cargo or barrier 71, the necks 23 of studs will be pushed back against the ends of the slots 76 and held there firmly because the heads 22 cannot come out. The pressure produced by the device 11 will be transmitted through the cargo 71 and will force the necks 64 of the studs 62 against the ends of the slots 77. The firmness with which the devices 11 and 59 will be held in place can be improved by arranging the studs 21 so that the distance between the lower surface of the wall 24 and the juxtaposed surface of the stud heads 22 is equal to the thickness of the portion 17 of the support 16.

Figure 3:
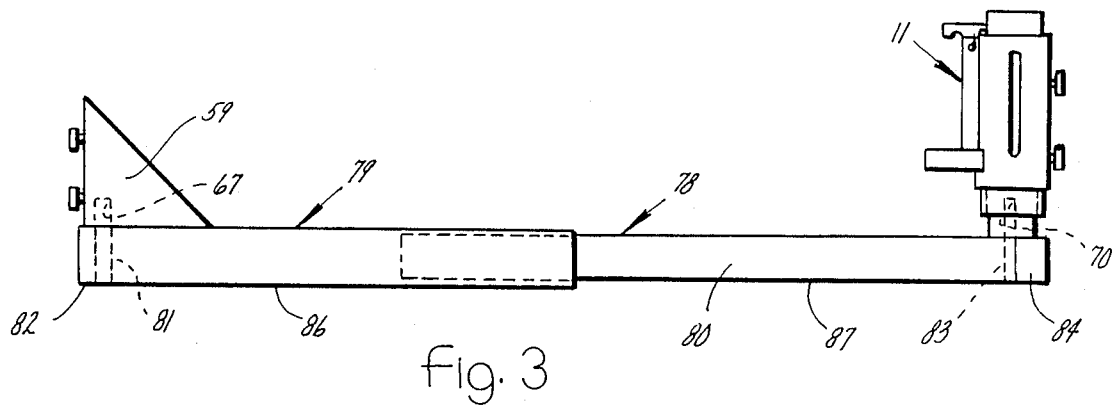
FIG. 3 shows a plane view of a telescopic bar attached to two types of restraining devices.

FIG. 3 shows the two restraining devices 11 and 59 of FIG. 1 supporting the ends of a telescopic bar 78 formed of elongated members 79 and 80. At least the member 79 is hollow to receive the member 80, but the member 80 can also be a hollow tube. The tube 79 has a pin 81 projecting perpendicularly from it near one end 82. This pin fits into the hole 67 in the restraining device 59, and a similar pin 83 at the end 84 of the elongated member 80 that fits into the hole 70.

Normally the same restraining device 11 or 59 would be used at both ends of the bar 71, but it is possible to use the adjustable device 11 at one end and the fixed device 59 at the other end, as shown in FIG. 3. In any case, the edges 86 and 87 of the members 79 and 80 are pressed against the cargo (not shown in this figure), which holds the pins 81 and 82 in place in the recesses 67 and 70.

Figure 4:
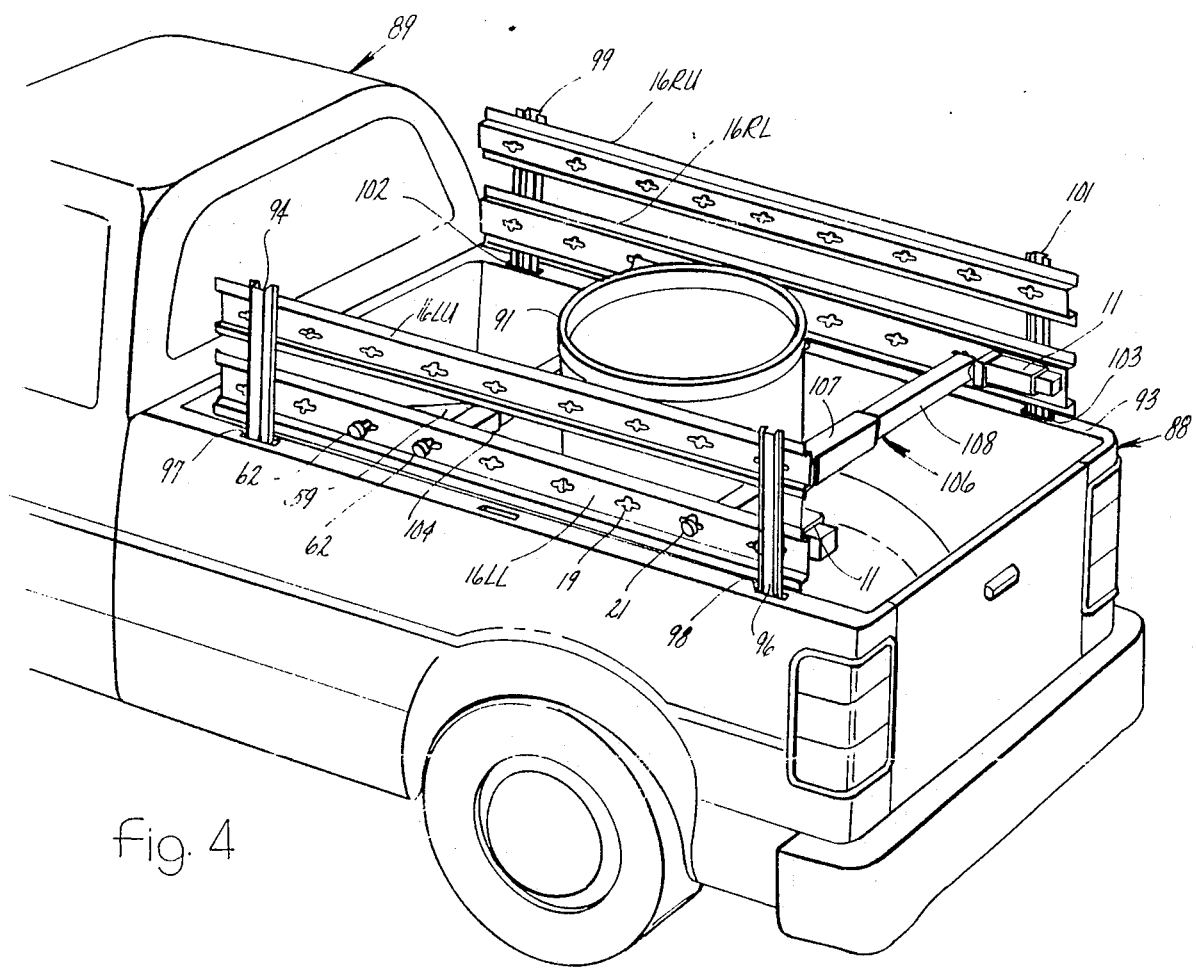
FIG. 4 is a perspective view of a cargo restraining arrangement that includes restraining devices of the type shown in FIG. 1 and telescopic barrier bars joined to those devices.

FIG. 4 shows the bed 88 of a pick-up truck 89 arranged to transport cargo, such as a cylindrical barrel 91, held in place by apparatus described in detail in connection with FIGS. 1–3. Two elongated channel members illustrated in FIGS. 1 and 2 as members 16 are mounted on each side wall 92 and 93 of the bed 88. To identify these channel members clearly they are designated by reference characters 16LL and 16LU for the lower and upper members on the left side of the truck and 16RL and 16RU for the corresponding members on the right side. The members 16LL and 16LU are bolted to vertical steel channel members, or stakes, 94 and 96 inserted in stake holes 97 and 98, respectively in the sidewall 92. Correspondingly, the members 16RL and 16RU are bolted to vertical stakes 99 and 101 inserted in stake holes 102 and 103 in the sidewall 93. The barrel, which happens to be the cargo in this instance, is retained in place against fore and aft movement by the bars 104 and 106. Only one end of the bar 104 is visible and it is held in place by the retraining device 59, which is attached to the member 16LL by the studs 62. It can be assumed that the other end of the bar 104 is held by a similar restraining device 59. Both ends of the ar 106 are held in place by the adjustable restraining devices 11. This permits both ends of the latter bar to be moved longitudinally relative to the truck bed 88, thus pressing the bar against the barrel 91 and the barrel against the bar 104. The bar 104 is cut to the proper length to extend from one side- wall 92 to the other sidewall 93, but the bar 106 is illustrated in this embodiment as being a telescopic bar to allow its length to be adjusted. The bar 106 consists of a hollow tube 107, which is held by the restraining device 59 attached to the member 16LL, and a bar 108 that has a cross-sectional size small enough to fit into the tube 107. The bar 108 can be either solid or hollow, and it is held by another restraining device 11 attached to the member 16RL. Having adjustable devices 11 holding the ends of the bar 106 permits the location of the pressure surfaces 58 (see FIG. 1) of both restraining devices 11 to be adjusted to be in the exact position required to eliminate any fore and aft movement of the barrel 91, but it is not always necessary to hold the cargo immobile. In many cases, it is sufficient to attach both bars 104 and 106 to the members 16 by the non-adjustable restraining devices 59 even though this leaves a small amount of room, which, at most, is the distance between two of the holes 19, in which the cargo can move around in response to movement of the truck 89 or any other cargo carrier.

The elongated members 16LL, 16LU, 16RL, and 16RU are mounted on the stakes 94, 96, 99 and 101 as extensions of the vertical sidewalls 92 and 93, but these are not the only locations where the elongated members can be mounted. They, or even one of them, can be mounted on the floor, sidewalls, ends or ceiling of any structure in which the cargo, of whatever size and shape, is to be held in a fixed position.

Figure 5:
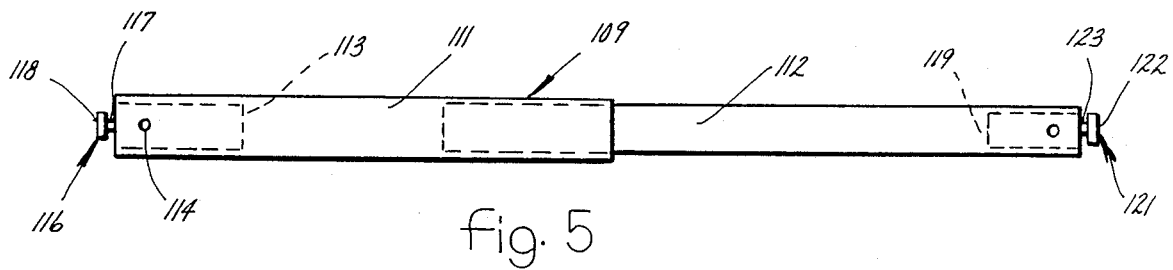
FIG. 5 is a side view of another restraining device according to this invention.
Figure 6:
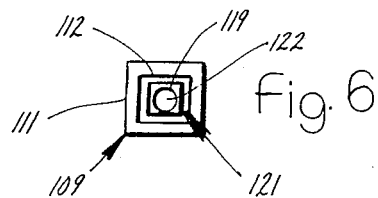
FIG. 6 is an end view of the restraining device in FIG. 5.

FIGS. 5 and 6 show a telescopic bar 109 made up of a hollow member 111 and a second member 112 of smaller external dimensions. The member 111 has a simple restraining device 113 inserted in one end and held in place by a pin 114. A stud 116 having a neck 117 and a head 118 and which may be identical to the studs 21 or 62 in FIG. 1, extends from the outer end of the restraining device 113 to fit into any of the holes 19 in the member 16 in FIG. 1.

The restraining device 113 is not adjustable, and it is preferable that the cargo be pressed against the bar to force the neck 117 into either the slot 76 or 77 (see FIG. 2) of the hole 19 so that the head 118 cannot accidentally come out through the large central part 74 of the hole 19. There is a similar restraining device 119 inserted in the outer end of the member 112. The restraining device 119 differs from the restraining device 113 only in being small enough to fit into the smaller member 112. A stud 121 comprising a head 122 attached to a neck 123 extends from the outer end of the device 119 and can be just like the stud 116.

Figure 7:
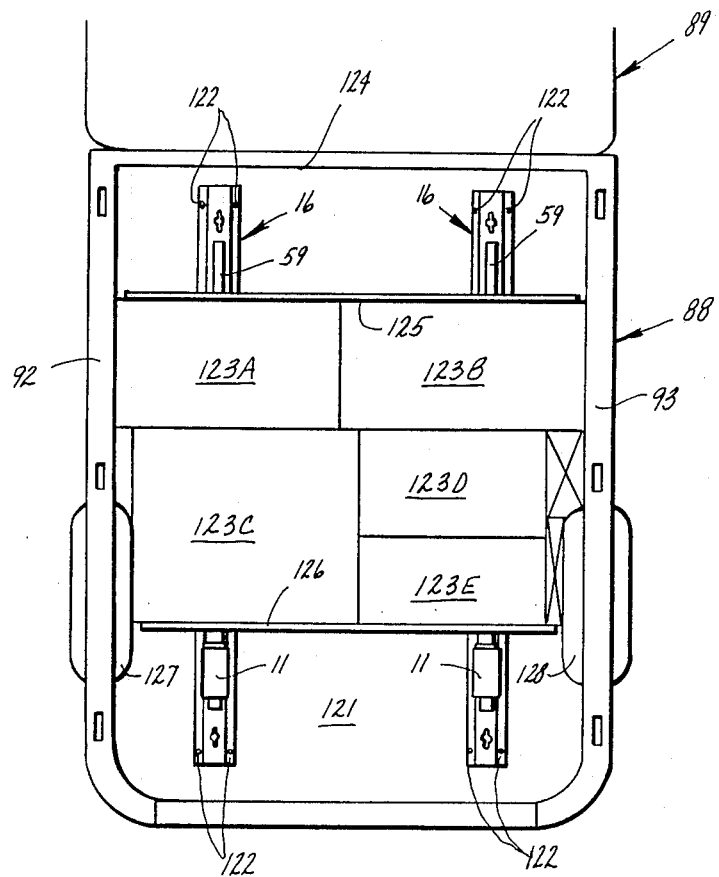
FIG. 7 is a top view of the loaded cargo area of a trunk that has two of the restraining structures of FIG. 1 bolted to the floor.

One of the most convenient ways to use the apparatus of this invention to hold cargo in a fixed position is illustrated in FIG. 7. That figure shows two support members 16 bolted to the left and right sides of the floor 121 of the bed 88 of the pickup truck 89 by means of bolts 122 through the bolt holes 75 shown in FIG. 2. Only the end portions of the support members are shown in FIG. 7, most of each support member being underneath cargo cartons 123A–123E. Non-movable restraining devices 58 are placed at the forward ends of the support members 16 adjacent the forward wall 124 of the truck bed 88. However, the support members can be further secured by additional bolts along the flanges.

The cartons need not be of the same size and are not identical in this figure. They are held in place between two bulkheads 124 and 126, which may be made of plywood or any other suitable material. In loading the truck 89, the restraining devices 59 are first placed at suitable locations on the respective support members. The bulkhead 125 can then be temporarily held in place and the cartons 123A or 123B or any other cargo can be pushed against this bulkhead to hold it more firmly in position. Typically, but necessarily, the first cartons 123A and 123B placed on the bed 88 will be expected to be the last to be unloaded.

The cartons 123A and 123B are illustrated as extending the full width of bed 88, which would keep them from moving sideways, but the cartons 123C–123E do not fill the entire available width, which is encroached on by the wheel wells 127 and 128 in this embodiment. To keep the cartons 123C–123E from shifting sideways, filler material 129 can be placed between the carton 123 and the sidewall 93, and additional filler material 131 can be placed between the carton 123E and the wheel well 128. The bulkhead 126 will typically be put in place after all or most of the cartons have been arranged as desired.

The loading arrangements shown in FIGS. 4 and 7 are not the only ones that can be used. However, they do give some idea of the flexibility of types and placement of cargo that can then be restrained by the different embodiments of this invention.

While the invention has been illustrated with reference to specific embodiments, it will be recognized by those skilled in the art that modifications may be made therein without departing from the true scope of the invention. Accordingly,

I claim:

1. A restraining device to be held rigidly but releasably on a support member at any of a plurality of locations spaced apart from one another by a first distance in a predetermined direction to limit movement of cargo in that direction, the restraining device comprising:

first engagement means at each of the locations;

main movable means;

second engagement means firmly joined to the main movable means to engage the first engagement means at any of the locations;

a movable member movably mounted with respect to the main movable means;

a plurality of teeth on the movable member, corresponding locations on adjacent teeth being spaced apart from one another by a second distance less than the first distance; and a pawl mounted on the main movable means and movable into engagement with any accessible tooth as determined by the position of the movable member to block the movable member in a fixed position relative to the main movable means according to which tooth is engaged.

2. The restraining device of claim 1, in which the number of the teeth times the distance from a location on one tooth to the corresponding location on the next adjacent tooth is at least as great as the first distance.

3. The restraining device of claim 1, in which the pawl is pivotally mounted on the channel means to move the accessible tooth a fourth distance that can be as great as the second distance.

4. The restraining device of claim 1, in which the support member is an elongated channel member comprising a raised central rib that has a plurality of holes spaced apart by the first distance in a longitudinal direction, and the engagement means comprises first and second studs rigidly attached to the channel means and extending from an external surface thereof and spaced apart in the longitudinal direction by said first distance to fit into two of the holes in the central rib of the channel member to keep the engagement means aligned with the channel member and in fixed position thereon, each of the studs having an enlarged head shaped to fit through any of the holes in the central rib and a neck of reduced diameter, the neck having a length substantially equal to the thickness of the rib to allow the neck to be forced against a part of the wall defining the respective hole, whereby the stud can be locked in the respective hole by engagement of said part of the wall between the juxtaposed surfaces of the head and the external surface of the channel means without rotating the channel means.

5. The restraining device of claim 4, in which each of the holes is formed by:

a central wall portion defining an open area large enough to receive the head of one of the studs, and diametrically opposite slots extending in the direction toward the next such hole, each slot being as wide as the neck of a stud but narrower than the head of a stud.

6. The restraining device of claim 1, comprising, in addition, resiliently biased latching means, to hold the handle means fast to the channel means when the handle means is in position to cause the pawl to press the accessible tooth to the forwardmost location of the pawl.

7. The restraining device of claim 6, in which the handle means comprises a hollow tube and the latching means comprises:

a plunger movable longitudinally in the hollow tube; and an external hook located to engage the second end of the wall means when the handle means is pivoted to the end of its range of its travel toward the wall means.

8. The restraining device of claim 6, in which the external hook is attached to the plunger to move therewith relative to the tube, and the tube and the plunger of the handle means have holes positioned to be in alignment with each other when the hook engages the second end of the wall means, whereby the plunger and the tube can be locked together to keep the movable member locked in a fixed position.

9. The restraining device of claim 8, in which the axial depth of the threaded hole and the axial length of the threaded plug are each greater than the distance between corresponding points on adjacent ones of the teeth, whereby the threaded plug can be moved a distance greater than the second distance.

10. The restraining device of claim 1, in which the front end of the movable member has a longitudinal, internally threaded hole, and the adjustable member comprises an externally threaded plug threaded into the hole.

11. The restraining device of claim 1, comprising adjustable means mounted on the movable member and extending from the front of the movable member, the adjustable means being movable by a third distance in the predetermined direction.

12. The restraining device of claim 11, in which the maximum value of the third distance by which the adjustable means can be moved is at least as great as the second distance.

* * * * *